(No Model.)   3 Sheets—Sheet 1.
W. I. ELY.
Cornstalk Harvester.
No. 232,474.   Patented Sept. 21, 1880.
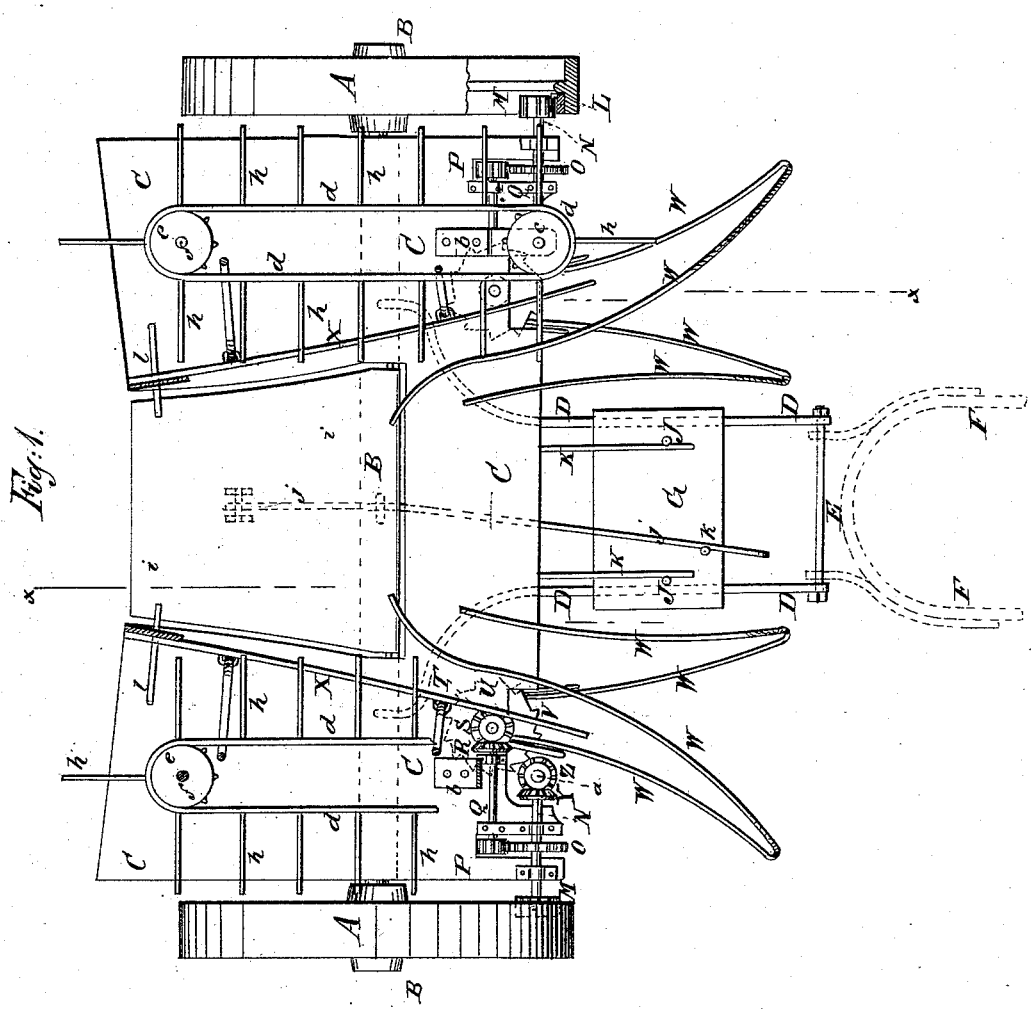
WITNESSES:
Chas. Nida.
C. Sedgwick
INVENTOR:
W. I. Ely
BY Munn & Co
ATTORNEYS.

(No Model.) 3 Sheets—Sheet 2.
W. I. ELY.
Cornstalk Harvester.
No. 232,474. Patented Sept. 21, 1880.
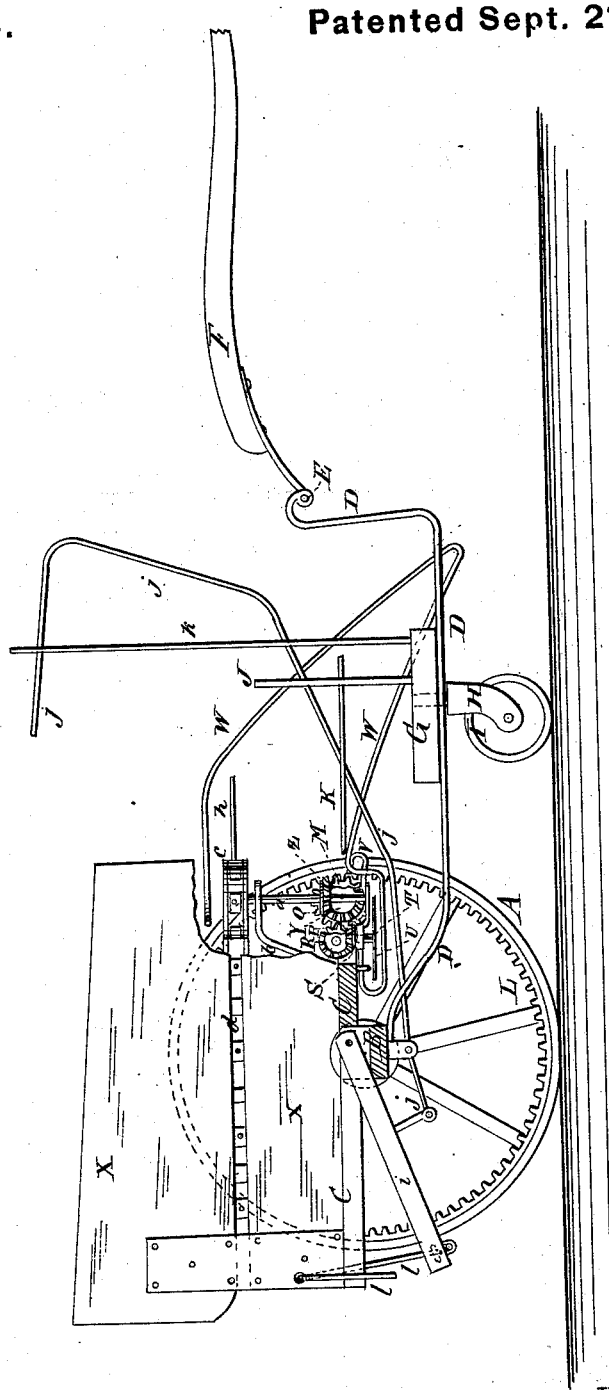
WITNESSES:
Chas. Nigg.
C. Sedgwick
INVENTOR:
W. I. Ely
BY Munn & Co
ATTORNEYS.

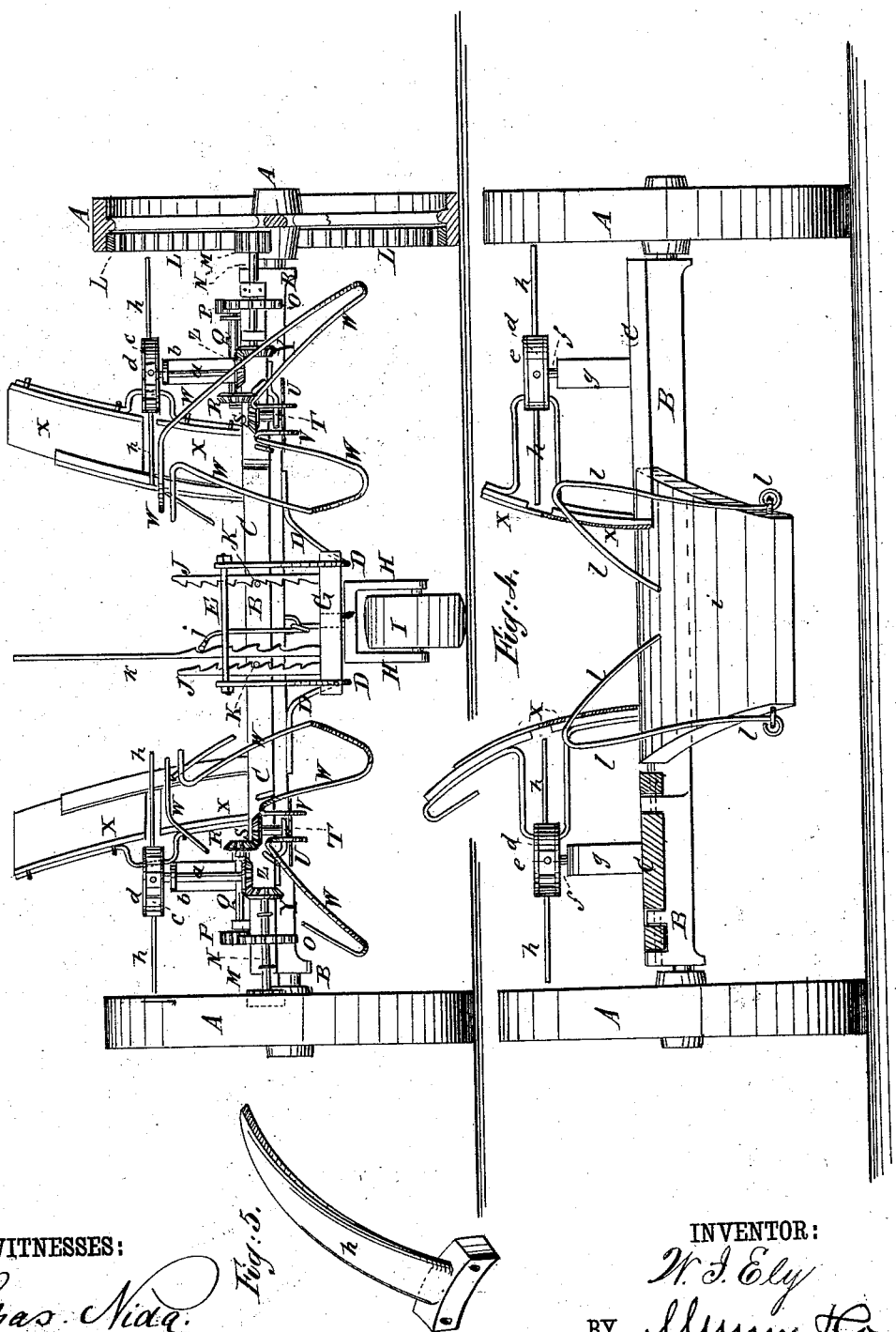

UNITED STATES PATENT OFFICE.

WILLIAM I. ELY, OF FREEHOLD, NEW JERSEY.

CORNSTALK-HARVESTER.

SPECIFICATION forming part of Letters Patent No. 232,474, dated September 21, 1880.

Application filed July 17, 1880. (No model.)

*To all whom it may concern:*

Be it known that I, WILLIAM I. ELY, of Freehold, in the county of Monmouth and State of New Jersey, have invented a new and useful Improvement in Cornstalk-Harvesters, of which the following is a specification.

Figure 1, Sheet 1, is a plan view of the improvement. Fig. 2, Sheet 2, is a sectional side elevation taken through the broken line $x\ x$, Fig. 1. Fig. 3, Sheet 3, is a front elevation. Fig. 4, Sheet 3, is a sectional rear elevation. Fig. 5, Sheet 3, is a perspective view of one of the reel-arms.

The object of this invention is to furnish harvesters for cutting cornstalks while standing in the field, which shall be so constructed as to raise inclined and fallen stalks, cut the stalks, and drop them upon the ground in even bundles, and which shall be simple in construction and reliable in operation.

The invention consists in constructing a cornstalk-harvester of the wheels, the axle, the main platform having its rear middle part cut away, the draw-bars carrying the forward platform, and the caster-wheel forming the carriage, the bent guide-bars for raising bent stalks and guiding the stalks to the cutters, the rotary cutters and their driving-gearing, the reels and their driving-gearing, the sideboards having longitudinal slots to receive the reel-arms, the hinged platform, the hinged and bent stop-rods, the lever and ratchet-bar for operating and holding the hinged platform, and the projecting bars and the ratchet-bars for adjusting the forward edge of the main platform, as will be hereinafter fully described.

Similar letters of reference indicate corresponding parts.

A represents the wheels of the axle B, to which axle the platform C is attached. To the middle part of the axle B are attached the rear ends of the draw-rods D, the forward ends of which are bent upward and are connected by a cross-rod or long bolt, E, to which are attached the thills F, that receive the draft and control and guide the machine.

To the forward parts of the draw-rods D is attached a platform, G, to which the driver's seat is designed to be attached.

To the lower side of the platform G is swiveled the standard H of a caster-wheel, I, to support the forward part of the machine.

To the platform G are attached two upright ratchet-bars, J, to receive and hold the forward ends of the bars K, the rear ends of which are rigidly attached to the forward part of the platform C, so that the forward edge of the platform C can be raised and lowered to cut the stalks farther from or closer to the ground by adjusting the bars K in the teeth of the ratchet-bars J.

To the wheels A are attached, or upon them are formed, gear-wheels L, into the teeth of which mesh the teeth of the small gear-wheels M, attached to the outer ends of the shafts N. The shafts N work in bearings attached to the side parts of the forward end of the platform C, and to the middle parts of the said shafts are attached large gear-wheels O, the teeth of which mesh into the teeth of small gear-wheels P, attached to the shafts Q. The shafts Q are placed parallel with the shafts N, and work in bearings attached to the side parts of the forward end of the platform C.

To the inner ends of the shafts Q are attached small beveled-gear wheels R, the teeth of which mesh into the teeth of small beveled-gear wheels S, attached to the upper ends of short vertical shafts T. The shafts T pass down through the platform C, revolve in bearings attached to the said platform C, and to their lower ends are attached the rotary cutters U. The cutters U are made with teeth like saw-teeth, but with sharp edges, and are so placed that they may project a little beyond the forward edge of the platform C and cut the stalks against guards V, attached to the forward end of the said platform C. The stalks are guided into the spaces between the cutters U and the guards V by guide-rods W, two to each cutter U, which guide-rods are attached at one end to the forward edge of the platform C, upon the opposite sides of the said spaces. The guide-rods W of each pair incline downward and from each other, and are bent back upon themselves at an acute angle, and their upper arms incline upward toward each other, so as to guide the stalks to the platform C at the sides of the side-boards X, attached to the said platform C.

To the inner ends of the shafts N are attached small beveled-gear wheels Y, the teeth of which mesh into the teeth of the small beveled-gear wheels Z, attached to the lower parts of the short upright shafts $a$. The lower ends of the shafts $a$ revolve in bearings attached to the platform C, and their upper parts revolve in bearings in brackets $b$, attached to the said platform C.

To the upper ends of the shafts $a$ are attached chain-wheels $c$, around which pass endless chains $d$. The endless chains $d$ also pass around chain-wheels $e$, which revolve upon upright shafts $f$ attached to the platform C, and to brackets $g$ attached to the said platform.

To the endless chains $d$ are attached arms $h$, which are slightly curved, as shown in Fig. 5, and project through slots in the side-boards X, so as to take hold of the cornstalks as they are cut, carry them through the rear parts of the guide-rods W, and deposit them upon the hinged platform $i$, which is placed in an opening in the rear middle part of the platform C, and is hinged at its forward end to the said platform C.

To the hinged platform $i$, or to an arm attached to the said platform, is pivoted the end of a lever, $j$, which is pivoted to the axle B. The lever $j$ projects forward beneath the platform G, and is bent upward and rearward so as to pass up around the forward end of the said platform G and engage with the teeth of a ratchet-bar, $k$, attached to the said platform G, so that the hinged platform $i$ can be dropped or lowered to discharge a bundle of stalks, and again raised into a horizontal position by operating the said lever $j$.

To the side edges of the rear end of the hinged platform $i$ are hinged the lower ends of two rods, $l$, which pass up through short slots in the rear parts of the platform C, are bent inward and downward at an acute angle, and their free ends project downward and inward through holes in the side-boards X, or in plates attached to the said side-boards. With this construction, when the hinged platform $i$ is lowered to dump a bundle of stalks the free arms of the rods $l$ are projected downward and inward, so that their ends will meet and overlap each other to receive and support the stalks that may be deposited upon the machine while the said hinged platform $i$ is lowered. When the hinged platform $i$ is again raised the free arms of the rods $l$ are pushed up through the holes in the side-boards X, so as to allow the stalks to again fall upon the said hinged platform $i$.

Thin side boards or plates should be attached to the side edges of the hinged platform $i$ to overlap the side-boards X, and prevent stalks from getting between the side edges of the hinged platform $i$ and the platform C or side-boards X and obstructing the movements of the said hinged platform $i$.

Having thus fully described my invention, I claim as new and desire to secure by Letters Patent—

1. A cornstalk-harvester constructed substantially as herein shown and described, consisting of the wheels A, the axle B, the platform C, having its rear middle part cut away, the draw-bars D, carrying the platform G, the caster H I, the bent guide-bars W for raising bent stalks and guiding the stalks to the cutters, the rotary cutters U and their driving mechanism, the reels $e\ d\ h$ and their driving mechanism, the side-boards X, having longitudinal slots to receive the reel-arms $h$, the hinged platform $i$, the hinged bent rods $l$, the lever $j$ and ratchet-bar $k$, for adjusting and holding the hinged platform $i$, and the bars K and ratchet-bars J, for adjusting the forward edge of the platform C, as set forth.

2. In a cornstalk-harvester, the combination of the wheels A, the axle B, the platform C, having its rear middle part cut away, the draw-bars D, carrying the platform G, and the caster H I, substantially as herein shown and described, to form a carriage to receive the operating parts of the machine, as set forth.

3. In a cornstalk-harvester, the combination, with the platform C, carrying the cutters U, and the platform G, attached to the draw-bars D, of the projecting bars K and the ratchet-bars J, substantially as herein shown and described, whereby the platform C can be adjusted to cause the cutters to cut the stalks closer to or farther from the ground, as set forth.

4. In a cornstalk-harvester, the combination, with the drive-wheels A, the platform C, and the slotted side-boards X of the reels $c\ d\ e\ h$, the gear-wheels L M Y Z, and the shafts N T $a\ f$, substantially as herein shown and described, whereby the stalks are carried back from the guide-rods W to the hinged platform $i$, as set forth.

5. In a cornstalk-harvester, the combination, with the platform C, having its rear middle part cut away, and the slotted side boards X, of the hinged platform $i$, the bent stop-rods $l$, the lever $j$, and the ratchet-bar $k$, substantially as herein shown and described, whereby the stalks are dropped to the ground in bundles, as set forth.

WILLIAM I. ELY.

Witnesses:
D. D. BAINE,
HORATIO CLAYTON.